United States Patent
Ferrell, Jr. et al.

(10) Patent No.: US 8,273,406 B1
(45) Date of Patent: Sep. 25, 2012

(54) PARTICULATE SOLID COATED WITH A CURABLE RESIN

(75) Inventors: James C. Ferrell, Jr., Rockwall, TX (US); James J. Lavene, Rockwall, TX (US)

(73) Assignee: Fritz Industries, Inc., Mesquite, TX (US)

( * ) Notice: Subject to any disclaimer, the term of this patent is extended or adjusted under 35 U.S.C. 154(b) by 768 days.

(21) Appl. No.: 12/456,706

(22) Filed: Jun. 19, 2009

(51) Int. Cl.
*B05D 7/00* (2006.01)

(52) U.S. Cl. .................. 427/214; 427/221; 166/280.2

(58) Field of Classification Search ............ 427/214, 427/221, 212, 213.31, 407.1; 166/280.1, 166/280.2; 428/403, 407
See application file for complete search history.

(56) References Cited

U.S. PATENT DOCUMENTS

| | | | |
|---|---|---|---|
| 3,290,391 A | 12/1966 | Prahl et al. ................. 260/619 |
| 3,929,191 A | 12/1975 | Graham et al. ............... 166/276 |
| 3,935,339 A * | 1/1976 | Cooke, Jr. ..................... 427/216 |
| 4,443,347 A | 4/1984 | Underdown et al. .... 252/8.55 R |
| 4,564,459 A | 1/1986 | Underdown et al. .... 252/8.55 R |
| 4,585,064 A | 4/1986 | Graham et al. ............... 166/280 |
| 4,664,819 A | 5/1987 | Glaze et al. ................. 252/8.551 |
| 4,694,905 A | 9/1987 | Armbruster ................... 166/280 |
| 5,422,183 A | 6/1995 | Sinclair et al. ............... 428/403 |
| 5,597,784 A | 1/1997 | Sinclair et al. ............... 507/219 |
| 5,604,184 A | 2/1997 | Ellis et al. .................... 507/117 |
| 5,693,684 A | 12/1997 | Rader ........................... 521/78 |
| 5,837,656 A | 11/1998 | Sinclair et al. ............... 507/220 |
| 5,948,734 A | 9/1999 | Sinclair ........................ 507/219 |
| 6,528,157 B1 | 3/2003 | Hussain ....................... 428/325 |
| 6,817,414 B2 | 11/2004 | Lee ............................... 166/278 |
| 6,866,099 B2 | 3/2005 | Nguyen ....................... 166/308.1 |
| 7,114,570 B2 | 10/2006 | Nguyen et al. .............. 166/295 |
| 7,132,389 B2 | 11/2006 | Lee .............................. 507/219 |
| 7,135,231 B1 | 11/2006 | Sinclair et al. ............... 428/407 |
| 7,306,037 B2 | 12/2007 | Nguyen et al. .............. 166/295 |
| 7,387,161 B2 | 6/2008 | Abass et al. ................. 166/280.1 |
| 2003/0224165 A1 * | 12/2003 | Anderson et al. ........... 428/403 |
| 2005/0051331 A1 | 3/2005 | Nguyen et al. ............. 166/280.2 |
| 2006/0035790 A1 | 2/2006 | Okell et al. .................. 507/269 |
| 2006/0052251 A1 | 3/2006 | Anderson et al. ........... 507/103 |
| 2007/0036977 A1 | 2/2007 | Sinclair et al. ............... 428/403 |
| 2007/0054054 A1 | 3/2007 | Svoboda et al. ........... 427/372.2 |
| 2008/0230223 A1 * | 9/2008 | McCrary et al. ........... 166/272.2 |

FOREIGN PATENT DOCUMENTS

| | | |
|---|---|---|
| EP | 0377308 A1 | 7/1990 |
| EP | 0771935 A1 | 5/1997 |
| EP | 1447523 A1 | 8/2004 |
| WO | WO 90/06904 | 6/1990 |
| WO | WO 2006/023172 A3 | 3/2006 |
| WO | WO 2007/147072 A1 | 12/2007 |
| WO | WO 2008/088449 A2 | 7/2008 |

OTHER PUBLICATIONS

Acrawax C, IMS Co, Dec. 15, 2000, 3 Pages.

(Continued)

*Primary Examiner* — John Goff
(74) *Attorney, Agent, or Firm* — Thomas R. Weaver

(57) ABSTRACT

This invention provides a process for coating particulate solids with a curable novolac resin without employing heat as a step of the process, comprising placing an epoxy resin which is curing on the particulate followed by placing a novolac resin capable of being heat cured on the epoxy resin before curing of the epoxy resin is complete.

9 Claims, 2 Drawing Sheets

OTHER PUBLICATIONS

Naxcat Mod Acid, Nease Corportation, Nov. 2, 2005, 4 Pages.
Durez 33681, Durez Corporatiion, Jul. 15, 2002, 9 Pages.
Plenco 13833, Plastics Engineering Co, Dec. 2003, 2 Pages.
D.E.R. 383, Dow Chemical Co, date unknown, 3 Pages.
D.E.H. 58, Dow Chemical Co, date unknown.
NPEL-127, Nan Ya, Jul. 1, 2002, 4 Pages.
Araldite 6005, Electron Microscopy Sciences, Jun. 15, 2006, 5 Pages.
Byk-333, Byk-Chemie USA Inc, Jan. 1, 2006 4 Pages.
T-Det-C40, Hacros Chemicals Inc, Jan. 9, 2009, 5 Pages.
Fritzprop CA-1, Fritz Industries Inc, May 3, 2005, 4 Pages.
Fritzprop CA-2, Fritz Industries Inc, Oct. 21, 2008, 2 Pages.

* cited by examiner

PARTICULATE SOLID COATED WITH A CURABLE RESIN

BACKGROUND OF THE INVENTION

1. Technical Field of the Invention

This invention relates to resin-coated particulate solids. The invention further relates to a method of coating particulate solids with a curable resin. The invention still further relates to a method of treating a subsurface formation, such as a hydrocarbon containing subsurface formation, with particulate solids coated with a curable resin.

2. Description of the Prior Art and Problems Solved

It is known in the art to employ particulate solids in processes for treating subterranean formations. One such process is referred to as formation fracturing; another is referred to as gravel packing. The word proppant is employed in the art to describe a particulate solid employed in formation fracturing. Particulate solids employed in fracturing and gravel packing processes have been selected from various different materials including silica sand, sintered bauxite, glass spheres and ceramics.

Various publications, such as the ones identified below, disclose terms which are conventionally employed in the art to describe resins and their properties. Such terms include resin, fusible, infusible, thermosetting, cure and curing, thermoplastic, phenolics, phenol formaldehyde resin, novolac, resole, resite and epoxy resin. These terms, chemicals and related concepts are defined below and apply to the art in general as well as to the specific subject matter of this invention. Accordingly:

A resin can be a naturally occurring material or a synthetic material. A synthetic resin is a man-made polymer resulting from a chemical reaction between two or more substances, usually in the presence of supplied heat and/or a catalyst. It has been suggested, for purposes of precision, that the phrase "synthetic polymer" be employed instead of the phrase "synthetic resin" to emphasize the man-made nature of the material. The resins employed herein are preferably, but are not limited to, synthetic polymers.

The term fusible has been derived from the word fusion, which through custom of usage, has assumed the meaning of melt and blend. Accordingly, fusible is an adjective which clarifies that a designated material is capable of being softened, melted or liquified by heating.

The word infusible is the opposite of fusible. Accordingly, infusible is an adjective which clarifies that a designated material is unable to be softened, melted or liquified by heating.

In view of the above, a fusible resin, in the context of the present invention, is preferably a synthetic polymer capable of being softened, melted or liquified by heating, and, conversely, an infusible resin, in the context of the present invention, is preferably a synthetic polymer which, after having been cured, cannot be softened, melted or liquified by heating.

A thermosetting resin, that is, a thermoset, is preferably a synthetic polymer which, by application of heat, by chemical reaction, by application of pressure or by some combination thereof, becomes a solid which is hard and rigid. The solid state is permanent and irreversible. That a polymer is a thermoset is a property of the polymer. Not all polymers have that property.

The words cure and curing, when used in connection with a thermosetting resin, are employed to specifically refer to the process by which a thermoset is irreversibly converted to a solid material which is permanently hard and rigid. The curing process, which, as stated, proceeds by application of heat, by chemical reaction, by application of pressure or some combination thereof, causes the molecular chains of the polymer to react at chemically active sites of the polymer to form a cross-linked structure whose molecular weight and melting point is greater than that of the original thermoset. Heating of the formed permanently hard and rigid material after completion of the curing process will not cause the material to soften or melt to thereby enable it to be reformed. The material will decompose before melting. The formed solid material is said to be infusible.

A thermoplastic resin is a polymer which, upon application of heat, melts and/or softens and can be formed or molded. Upon cooling the polymer solidifies, becomes rigid and retains the molded shape. It can be reheated and again be melted and/or softened. The formed solid material is not a permanent condition. It can be reversed. The formed solid is said to be fusible.

The word phenolic is a term employed in the art to generally designate a family of synthetic polymers made by the reaction of phenol and an aldehyde, such as formaldehyde. Synthetic polymers thus generally designated by the term phenolic include a number of specific reaction products which include one-step phenolic resins (A-stage/resole resins) and novolac resins. The term resite designates a thermoset produced from a resole. (In this regard note Graham et al U.S. Pat. No. 3,929,191 and Underdown et al U.S. Pat. No. 4,443,347.) A phenolic resin can be classed as either a thermoset or a thermoplastic depending on its initial designation as a one-step phenolic resin, a novolac resin, or a resite.

Formaldehyde can react with phenol at three different sites (two ortho sites and one para site) on the phenol molecule. The reaction can be conducted in an acid environment or in an alkaline environment. Whether the synthetic polymer product of the reaction is classed as a thermoset or a thermoplastic is a function of the mole ratio of formaldehyde to phenol in the reaction.

It is known that base catalyzed phenol formaldehyde resins are made with a formaldehyde to phenol ratio of greater than one (usually around 1.5 to 1). It is believed that phenol-formaldehyde resins made with a formaldehyde to phenol ratio of greater than one are usually a thick reddish-brown liquid which will begin to cross link at a temperature of about 120°C. to produce a highly cross linked solid. Phenol-formaldehyde resins made with a formaldehyde to phenol ratio of greater than one do not require addition of a cross linking agent to cure.

The acid catalyzed reaction between phenol and formaldehyde involves a mole ratio of formaldehyde to phenol of less than one. The reaction product is referred to as a novolac. A novolac, due to the low molar ratio of aldehyde to phenol, will not completely cure without addition of a cross linking agent. Accordingly, a novolac is a thermoplastic synthetic polymer. It is fusible and does not become infusible until addition of an appropriate cross linking agent to complete the curing process. A novolac is generally alcohol soluble. Cross linking agents include hexamethylenetetramine and paraformaldehyde which react with the novalac at temperatures in the range of from about 200 to about 400° F. for conversion to cured, cross-linked structures. Such heating can proceed downhole in the presence of formation water.

The term resole is further defined in Underdown et al U.S. Pat. No. 4,443,347 in a way which is consistent with the definition provided in Graham et al U.S. Pat. No. 3,929,191. According to Underdown et al, a resole is a phenolic resin product of the condensation of a phenol with an aldehyde under alkaline conditions, wherein the condensation is stopped at an early stage. The resulting partial condensation is capable of further condensation to an infusible or thermoset condition.

Resite is the term employed to describe the infusible product produced by the further condensation of a resole.

An epoxy is a synthetic polymer commonly produced by the reaction of epichlorohydrin and bisphenol-A. The reaction product is a thermoset which cures when mixed with a hardening agent. The heat and chemical resistance of the cured thermoset can be improved by heating the cured thermoset to a value above room temperature, but heating beyond room temperature is not required in order to effect a complete cure. The hardening agent employed to cure the epoxy can be an amine, R—NH$_2$, such as diethylene triamine (DETA) and triethylene tetramine (TETA).

Graham et al in U.S. Pat. No. 3,929,191 disclose the treatment of subterranean formations employing particulate solids coated with a synthetic resin. The synthetic resin disclosed in the 100 patent, is known by several names including A-stage resin, resole and one-step resin. This 101 resin is an alkaline-catalyzed, thermosetting phenol-formaldehyde resin consisting primarily of partially condensed phenol alcohols. The resin is soluble in certain solvents, such as alcohols and ketones, is fusible and is curable by application of heat alone without need of an additional catalyst or a curing agent. According to Graham et al, the mole ratio of aldehyde (formaldehyde) to phenol is in the range of from about 1 to 1 to about 1.5 to 1. Further, according to Graham et al, the polymerization reaction can be stopped by cooling the mass to form a solid, partially polymerized thermoset which is soluble in organic solvents and is fusible. Graham et al state, that the partially polymerized thermoset, in solid powdered form, can be dissolved in a suitable solvent, placed on a particulate solid where the thermoset, subsequent to evaporation of the solvent, remains as a coating. Thereafter, the coated particulate can be heated, for example, in a subsurface formation, and the resin, being fusible, is eventually cured to an insoluble, infusible cross linked state. It is understood that heating of the coated particulate in a subsurface formation can be expected to proceed in the presence of water naturally present in the formation. Accordingly, the invention in U.S. Pat. No. 3,929,191 features the placement of a curable resole resin on a particulate solid without the use of heat as a step in the process, but it is evident that heat is employed to initiate the polymerization reaction (the curing) before the resin is applied to the substrate.

Graham et al in U.S. Pat. No. 4,585,064 provide an extensive list of particulate solids employed in oil field service operations. These materials, in selected size ranges, have been used in oil field operations as naturally occurring, and also have been used in oil field operations after having been first coated with one or more layers of various different resinous materials, such as epoxy resins, resole resins and novolac resins. The patent also discloses a list of resins employed to coat particulate solids, and still further discloses a method of placing two layers of resin materials on a substrate.

Underdown et al in U.S. Pat. No. 4,443,347 define the terms resole, novolac, phenolic and cured as those terms are employed herein.

Some methods employed to coat particulate solids with a resinous material have featured the separate step of heating the particulate material to an elevated temperature in the range of from about 100 to about 600 degrees Fahrenheit, followed by uniformly mixing the heated particulate material with a fusible resinous material to coat the material and thereafter cooling the coated material to terminate the curing reaction which was initiated by the heated particulate solids.

THE INVENTION

Disclosure of the Invention

This invention provides a process for coating a quantity of particulate solids with a curable resin. In another aspect the invention is a method of using the particulate solids coated with the curable resin as proppants in a fracturing service, and as particulate solids in a gravel packing service.

More specifically, this invention is a method of coating a quantity of particulate solids with a thermosetting resin without the use of solvents, or of premixing of thermosets or of supplying heat from an external source as a step, or steps, of the method. The product of the method is a mass of dry, flowable particulate solids having a curable coating. The dry, flowable particulate solids can be further treated with heat, chemicals, pressure or some combination to produce a product consisting of solids having an infusible coating.

The mentioned further treatment can be conducted as an element of the treatment of a subsurface formation in the presence of formation water.

According to the method of this invention, a first liquid thermoset, which has not been previously dissolved in any solvent, is placed as a coating on a mass of particulate solids which has not been previously heated. The resulting coated mass of particulate solids is then contacted with a liquid chemical which initiates the curing of the first thermoset to thereby produce a damp interim product. Thereafter, the interim product, while it is damp, is coated with a fusible second thermoset to thereby produce a mass of particulate solids having an undercoating, consisting of the first thermoset, and a fusible over coating consisting of the second thermoset which is curable. The particulate solids, having the curable fusible solid over coating, can be further treated with heat, chemicals, pressure or some combination to produce a product having an infusible coating. The first thermoset is chemically different than the second thermoset.

It is believed that the damp undercoating of the interim product causes the over coating to adhere to the undercoating. It is still further believed that the damp undercoating, upon application of the over coating, is not fully cured, but does continue to cure, and does completely cure, after application of the over coating.

Thus, according to the process of this invention, a coating consisting of a first resin is placed on a quantity of particulate solids, to produce an interim product. Thereafter, a coating consisting of second resin different from the first resin is placed on the interim product to thereby produce a dry, flowable, particulate solid product. The resin employed to produce the under coating is cured during the process. The resin employed to produce the over coating is not cured during the process but is curable at a later time. Accordingly, in performance of the method, the resin of the first coating is completely cured and the resin of the second coating is curable.

The method of this invention is performed without the use of supplied heat. That is, the curing of the first resin coating, and the application of the second resin coating is accomplished without the use of supplied heat as a step of the method.

The dry, flowable, particulate solid product of the method of this invention can be employed in a second method which operates to cure the curable second resin coating. In the second method, curing of the curable second coating can be accomplished by chemical agents employed by a user, or by heating, or by a combination of chemical agents and heating.

The second method is particularly useful in oilfield service operations which involve the fracture treatment of subsurface formations, and in operations to control the movement of particulate solids, such as proppants, from the formation into the well bore. For convenience such movement is sometimes referred to herein as proppant flow back. In oilfield service operations, the subsurface formation being treated can supply any required curing heat, wherein the heating is supplied in the presence of formation water.

DESCRIPTION OF THE PREFERRED EMBODIMENTS

Figure 1:
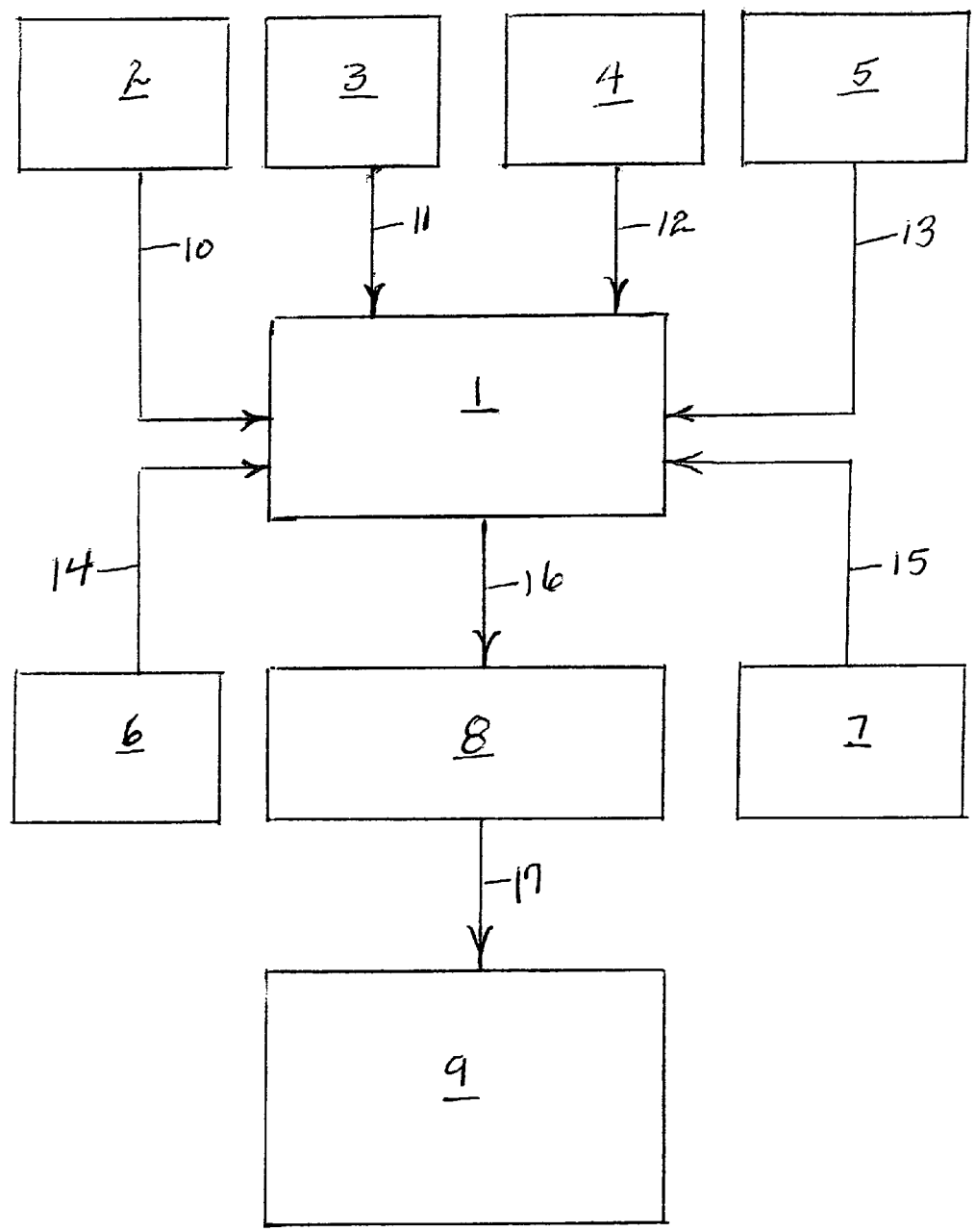
FIG. 1 is a schematic diagram of a process for placing a curable resin coating on a particulate solid.

Referring now to FIG. 1, container 1 is positioned to receive the contents of storage elements 2, 3, 4, 5, 6 and 7. Size separator 8 is positioned to receive the contents of container 1, and storage element 9 is positioned to receive the sized output from separator 8.

Thus, a weighed quantity of particulate solids, such as sand, ceramics, bauxite and glass spheres, is transferred from storage element 2 via path 10 and placed in container 1, which is adapted to enable the uniform mixing of particulate solids or is other wise equipped to effect the uniform mixing of particulate solids. The particulate solids placed in container 1 are not pre-heated and are not heated subsequent to being placed in container 1. The temperature of the particulate solids is equal to ambient temperature, and can therefore vary depending upon ambient conditions. In this regard, ambient temperature is considered to be equal to or less than about 100° F. Container 1 can be a piece of equipment referred to in the solids mixing art as a muller.

Thereafter, a weighed quantity of a first resin, at ambient temperature, is transferred from storage element 3 via path 11 and placed in container 1. The quantity of first resin, a liquid epoxy resin, is based on the quantity of particulate solids initially placed in container 1. Accordingly, the quantity of epoxy resin is an amount in the range of from about 0.4 to about 2.0, and preferably from about 0.7 to about 1.05, pounds of epoxy resin per 100 pounds of particulate solids. The liquid epoxy is not employed as a solution.

Mixing of the particulate solids and liquid resin is initiated in container 1, preferably after all of the particulate solids and first resin are placed in container 1. The goal of the mixing of the two ingredients is to obtain a product which, by visual inspection, is observed to be damp and to contain no visible clumps or agglomerates. The product of the mixing, for convenience, is referred to herein as the first interim product.

While mixing continues, a measured quantity of curing agent for the first resin is transferred, at ambient temperature, from storage element 4 via path 12 and placed in container 1 which contains the first interim product. The curing agent is a liquid aliphatic polyamine, such as diethylenetriamine, the quantity of which is based on the quantity of liquid epoxy resin, initially placed in container 1. Accordingly, the quantity of curing agent is an amount in the range of from about 0.15 to about 0.35 pounds of curing agent per pound of first resin.

The purpose of the curing agent is to cause the polymerization of the first resin which is a coating on the particulate solids initially placed in container 1. At this point, the content of container 1, for convenience, is referred to as the second interim product.

While mixing continues, a measured quantity of a second resin and curing agent therefor is transferred, at ambient temperature, from storage element 5 via path 13 and placed in container 1 which now contains the second interim product which is not completely cured and is damp.

The second resin is a novolac resin. The novolac will not cure until it is heated in the presence of a curing agent. The curing agent is, thus, heat activated. It is a chemical which functions to promote curing of the second resin when in the presence of a heated environment. The curing agent can be hexamethylenetetramine present in an amount in the range of from about 5 to about 15, and preferably about 10 percent by weight of the novolac. The curing agent can be and is preferably included in the second resin transferred from storage element 5.

The quantity of the combination of second resin and curing agent transferred from storage element 5 via path 13 is based on the quantity of particulate solids initially placed in container 1. Accordingly, the quantity of second resin and curing agent is an amount in the range of from about 1.2 to about 4.5 pounds of second resin and curing agent per 100 pounds of particulate solids.

The second resin and curing agent therefore can be transferred independently or in combination. It is evident that the amount of novolac added is an amount in the range of from about 1.04 to about 4.3 pounds novolac per 100 pounds of particulate solids, and also that the amount curing agent for the novolac is an amount in the range of from about 0.05 to about 0.22 pounds curing agent per 100 pounds of particulate solids.

Mixing continues for a time sufficient to obtain a uniform product. In this regard, a uniform product is believed to be obtained when the mixture, which for convenience is referred to as a particulate solid having a curable resin coating, is observed to be dry and flowable. The dry, flowable, product is comprised of the initial charge of particulate solids having a first coating, which is the curing first resin, and having a second coating, which is the curable second resin. Since the curing of the second coating is heat activated, the dry, flowable product should be stored at a temperature which is less than the temperature at which cross linking begins, and preferably less than about 100° to about 140° F. to prevent premature curing of the curable second resin. In addition, the relative humidity of the storage environment is preferably in the range of from about 40 to about 70 percent.

At this point, while continuing mixing, a free flow agent can be transferred from storage element 6 via path 14 and placed in container 1, and a dust suppressant can be transferred from storage element 7 via path 15 and placed in container 1.

A free flow agent useful herein is commercially available from IMS Company of Chagrin Falls, Ohio, under the trade name ACRAWAX C which is a combination of N,N'-ethylenebisstearamide (98%) and stearic acid (2%). The quantity of free flow agent is an amount in the range of from about 0.005 to about 0.02 pounds of free flow agent per 100 pounds of the initial charge of particulate solids.

A dust suppressant useful herein can be a composition consisting of 50 to 90 volume percent corn oil and 10 to 50 volume percent of a nonionic surfactant. A dust suppressant can be ethoxylated castor oil, commercially available from Harcros Chemicals Inc. of Kansas City, Kans. under the product name T-Det C 40. The quantity of dust suppressant is an amount in the range of from about 0.005 to about 0.02 pounds of dust suppressant per 100 pounds of the particulate solids.

Mixing is terminated upon completion of the addition and uniform blending of the desired amounts of materials from storage elements 2, 3, 4, and 5 and, optionally, of the desired amounts of materials from storage elements 6 and 7. It is to be understood that the additions of free flow agent and dust suppressant are optional, and are not required steps in the process for coating a particulate solid with a curable resin.

Mixing can be terminated and the resin coated product of the method can be sized and stored for future use, such as in formation fracturing and gravel packing. However, instead of complete termination of mixing, the mixing rate of mixer 1 can be slowed or a drum mixer can be interposed between mixer 1 and size separator 8 to continue movement of the product to avoid premature consolidation of the coated particulate with consequent formation of clumps and large agglomerates. It is believed that continuous movement of the product will operate to enhance the production of a product which is dry and flowable.

Upon termination of mixing the entire contents of container 1 can be transferred from container 1 via path 16 to the top of size separator 8. Size separator 8 can be a device known in the art as a "shaker" which is comprised of an array of vertically spaced screens. The array is mechanically vibrated or shaken to promote the downward movement of particulate solids through openings in the screens positioned in the array, wherein the openings in each screen are different from the openings in every other screen in the array. The screens are arranged in the array from top to bottom so that the screen having the largest openings is positioned at the top of the array and the screen having the smallest openings is positioned at the bottom of the array. Any other screens in the array are positioned therein in the order of screen openings. Material which does not pass through the openings in a screen are called the oversize or plus (+) of the screen, and material which does pass through the openings in a screen are called the undersize or minus (−) of the screen. Screens are classified by numbers, wherein the larger the number the smaller the screen opening. For example, in the United States Sieve Series, the openings in screen 20 are larger than the openings in screen 40.

The particulate solids initially placed in container 1 have a size in the range of from about +8 (2.362 mm) to about −140 (0.104 mm) United States Sieve Series. The dry, flowable, product transferred to size separator 8 from container 1 is shaken as described. The output from separator 8, having a size in the range of from about +8 to about −140 United States Sieve Series, is transferred from size separator 8 via path 17 and placed in storage element 9. Storage element 9 can be a bulk container or bags suitable for appropriate transport to some remote location, such as a well location.

The coated particulate solids which are a product of the above described process feature an undercoat in contact with the particulate solids which undercoat consists of a first resin which is curing, and an over coating in contact with the under coat which is not cured, but which is curable.

Figure 2:
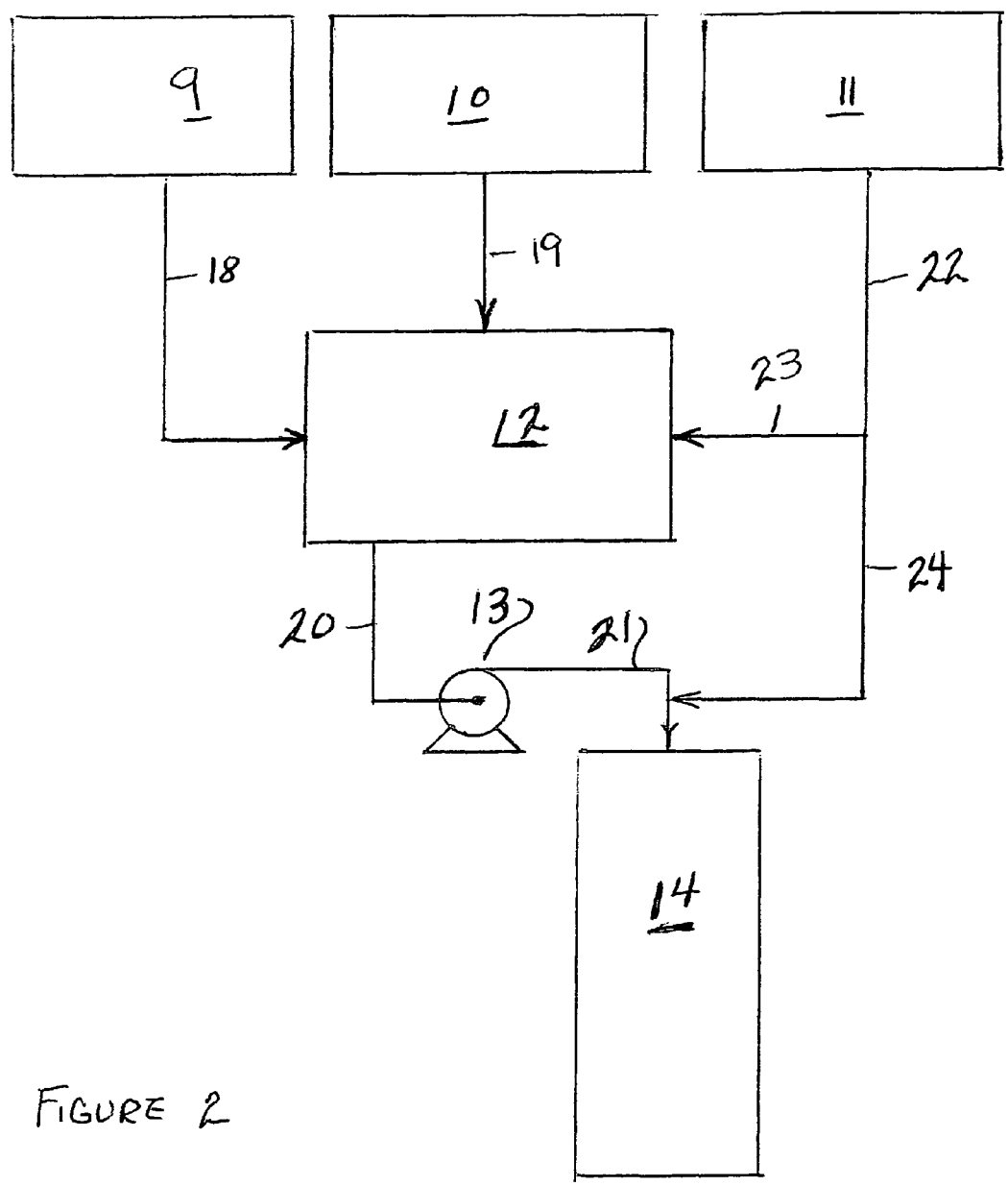
FIG. 2 is a schematic diagram of a process for curing the curable resin coating on the coated particulate solid made in the process shown in FIG. 1.

Referring now to FIG. 2, the solid particulate product maintained in storage element 9 can be mixed with a working fluid, such as a fracturing fluid, for use as a proppant in the fracture treatment of a subsurface formation. Accordingly, the sized, dry, flowable product made as described in FIG. 1 can be transferred by known means, such as by trucking, from storage element 9 to a remote location, such as an oil and gas well, and there transferred via path 18 to liquid/solids mixer 12 where it is mixed with a working fluid, such as a fracturing fluid, which is transferred from container 10 to mixer 12 via path 19. The proppant and fracturing fluid are combined in mixer 12, as is well known in the fracturing art, to form a mixture which is then transferred to pump 13 via path 20 and from there pumped via path 21 to well 14. The quantity of proppant mixed with the fracturing fluid is optional with the end user, however, it is believed that the quantity of proppant can be an amount in the range of from about 2 to about 12 pounds proppant per gallon of fracturing fluid.

The curable over coat on the proppant is cured to an infusible condition within the confines of, and under the temperature and water conditions, encountered within a selected subsurface formation penetrated by well 14. A chemical activator can be mixed with the proppant and fracturing fluid in situations where the formation temperature encountered is not sufficient to cure the overcoat within a period in the range of from about 3 to about 24 hours. A chemical useful as an activator is an aromatic sulfonic acid such as toluenesulfonic acid, xylene sulfonic acid and mixtures thereof, an example of which is commercially available from Fritz Industries, Inc. of Mesquite, Tex., under the trade name FritzProp CA-1. Another chemical useful as an activator is a glycol ether such as diethylene glycol monobutylether, an example of which is commercially available from Fritz Industries, Inc. of Mesquite, Tex., under the trade name FritzProp CA-1.

The activator is mixed with the proppant and fracturing fluid in an amount in the range of from about 0 to about 2 pounds of activator per 100 pounds of proppant.

The activator can be transferred from storage element 11 to mixer 12 via paths 22 and 23 or it can be transferred to path 21 via paths 22 and 24.

EXAMPLE 1

Three separate batches of resin-coated particulate material were prepared. Each of the three batches are identified in Table 1, below, as samples 1, 2 and 5.

The process employed to prepare each sample is described in connection with FIG. 1 of this invention. Accordingly, a weighed quantity of particulate material, more precisely 20/40 mesh US sieve series Ottawa sand, was placed in a muller, which is an apparatus known in the art to be useful to mix dry, solid, particulate material. The sand, referred to herein as the raw particulate, was dry and was not heated; that is, the temperature of the raw particulate was about equal to the ambient temperature which was about 70° F. After all of the raw particulate was placed in the muller a weighed quantity of a liquid epoxy resin, also at ambient temperature, was placed in the muller. After all of the epoxy resin had been added to the muller, the mixing device was activated to mix the two ingredients. Mixing of the two ingredients proceeded until the mixed blend was observed to be damp, and no clumps or agglomerates were visible. This mixing step was completed in about 2 minutes. The blend of the two ingredients, referred to herein as the first interim product, consisted of a mass of damp, particulate material.

A weighed quantity of liquid curing agent for the epoxy resin was added to the operating muller to be mixed with the first interim product. Mixing continued for about 0.5 minutes to thereby produce a uniformly blended mass of particulate material referred to herein as the second interim product. The second interim product was damp. The epoxy resin coating on the second interim product was not cured, but was in the process of being cured as a result of reaction between the curing agent and the resin.

At this point in the manufacturing process, the contents of storage elements 2, 3 and 4, as shown in FIG. 1, were now blended in container 1 with mixing continuing. The amount and chemical nature of the ingredients placed in container 1 are defined in Table 1, below, in connection with footnotes 1, 2 and 3 of samples 1, 2 and 5. No heat from any exterior source was employed in the process of making the second interim product.

Portions of second interim products 2 and 5 were then taken from container 1. The portions taken, which were about nature of the added dust suppressant is provided in Table 1, below, in connection with footnote 5 of samples 1, 2 and 5. The dust suppressant is referred to connection with storage element 7 of FIG. 1.

Thereafter, the resin-coated particulate content of the muller was screened as disclosed in connection with size separator 8 of FIG. 1 to produce a final product having particle sizes in the range of from +20 to −40 US sieve series.

TABLE 1

PREPARATION OF TEST SAMPLES

| | Ingredients | | | | | |
|---|---|---|---|---|---|---|
| Sample No. | Raw Particulate f.n. (1) lbs | Epoxy Resin f.n. (2) lbs | Epoxy Curing Agent f.n. (3) lbs | Novolac Resin and Hardener f.n. (4) lbs | Dust Suppressant f.n. (5) fl. oz. | Coating Ratio Pounds Coating per 100 Pounds Coated Particulate |
| 1 JL09049 A | 3000 | 16 | 4.6 | 42 | 24 | 2.044 |
| 2 JL09063 A | 3000 | 23 | 6.6 | 66 | 24 | 3.088 |
| 3 JL09063 B f.n. (6) | 3000 | 23 | 6.6 | | | 0.977 |
| 4 JL09066 B f. n. (7) | 3000 | 32 | 9.2 | | | 1.355 |
| 5 JL09066 A | 3000 | 32 | 9.2 | 85 | 24 | 4.037 |

Footnotes;
(1) All raw particulate employed was 20/40 mesh USS Ottawa Sand.
(2) Sample 1: Araldite 6005 liquid epoxy resin; Samples 2, 3, 4 and 5: NPEL-127 epoxy resin.
Araldite 6005 resin is a tradename of Electron Microscopy Sciences of Fort Washington Pennsylvania, for a composition commonly known as Bisphenol A Diglycidyl Ether Polymer. CAS# 25068-38-6.
NPEL-127 resin is a tradename of Nan Ya Plastics Corporation of Taipei, Taiwan, R.O.C., for a composition commonly known Bisphenol-A resin. CAS# 25068-38-6.
(3) The epoxy curing agent employed in all samples was DEH-58.
DEH-58 epoxy curing agent is a tradename of The Dow Chemical Company, for a composition described as a low viscosity accelerated aliphatic polyamine. The material is a combination of diethylenetriamine and 4,4-isopropylidenediphenol. It is believed that Bisphenol-A is another name for 4,4-isopropylidenediphenol.
(4) The novolac resin and hardener employed in all samples was Plenco 13833.
Plenco 13833 resin is a tradename of Plastics Engineering Company of Sheboygan, Wisconsin, for a composition containing novolac resin and hexamethylenetetramine present in an amount of about 10 percent by weight of the novolac resin.
(5) The dust suppressant employed in all samples was a blend consisting of about 70 volume percent corn oil and about 30 volume percent BYK 333.
BYK 333 is a tradename of BYK-Chemie USA of Wallingford, Connecticut, for a composition described as a polyether modified dimethylpolysiloxanecopolymer.
(6) Prior to addition of novolac, hardener and dust suppressant, about 5 pounds of sample 2 was taken and designated as sample 3.
(7) Prior to addition of novolac, hardener and dust suppressant, about 5 pounds of sample 5 was taken and designated as sample 4.

five pounds each, were designated as samples 3 and 4, respectively. The fractional amount and chemical nature of the ingredients of samples 3 and 4 were thus identical to the fractional amount and chemical nature of the ingredients of the second interim products which were the precursors of samples 2 and 5, respectively.

At this point, while mixing continued, a weighed quantity of a combination of a powder novolac resin and a hardener for the resin was added to the muller which contained the second interim product. The amount and chemical nature of the added combination is provided in Table 1, below, in connection with footnote 4 of samples 1, 2 and 5. After addition of the novolac and hardener, mixing continued for a time of about 30 minutes which was a time sufficient to produce a product which was observed to be dry and flowable.

At this point the thus produced product could be considered to be complete. It consisted of quantities raw particulate, an epoxy resin and a curing agent therefor a novolac resin and a curing agent therefor. An optional material to function as a dust suppressant was then added to the product in the muller which continued to operate. The amount and chemical The prepared test samples were not believed to be cured.

EXAMPLE 2

The Unconfined Compressive Strength (UCS) of the resin-coated particulate materials, identified as samples 1, 2, 3, 4 and 5 of Example 1, was determined. The results obtained for samples 1, 2 and 5 are reported in Table 2A, below. The results obtained for samples 3 and 4 are reported in Table 2B, below.

A. Five Test Specimens were Prepared as Follows (Activator was not Included).

1. A mass of resin-coated particulate, referred to as a slug, weighing 430 grams was taken from each one of samples 1, 2, 3, 4 and 5.

2. An aqueous solution consisting of 2 pounds of potassium chloride per 98 pounds of water was prepared. (2% KCl solution)

3. Each 430 gram slug was mixed with 200 milliliters of the 2% KCl solution until all of the coated material was contacted by the solution. The mixing time was about 10 minutes.

B. Five Test Specimens were Prepared as Follows (Activator was Included).

1. A mass of resin-coated particulate, referred to as a slug, weighing 430 grams was taken 433 from each one of samples 1, 2, 3, 4 and 5.

2. An aqueous solution consisting of 2 pounds of potassium chloride per 98 pounds of water was prepared. (2% KCI solution) In addition, 3.0 grams of activator was added to each 200 milliliters of the 2% KCI solution. The activator was diethylene glycol monobutyl ether (DEGMBE) available from Fritz Industries, Inc., of Mesquite, Tex., under the trademark FP-CA2.

3. Each 430 gram slug was mixed with 200 milliliters of the 2% KCI-activator solution until all of the coated material was contacted by the solution. The mixing time was about 10 minutes.

Each Test Specimen was Prepared as Follows.

1. The entire mixture of coated material (430 grams) and KCl (or KCI-activator) solution (200 ml) was placed in a High Temperature High Pressure (HTHP) Fluid Loss Cell.

The HTHP cell was a cylindrical container having an inside diameter of two inches and an axial length of ten inches. The container was equipped with end caps and was adapted to receive a 2 inch diameter movable piston. A relief stem was situated on one end cap. A nitrogen supply stem was situated on the second end cap. The HTHP cell was vertically positioned so that the piston and supply stem were on the bottom of the cell and the relief stem was on the top of the cell.

2. The mixture was placed in the vertically-positioned fluid loss cell over the top side of the piston within a time of about 30 minutes after preparation thereof. The mixture was evenly distributed in the cell and all air bubbles were removed.

3. The filled cell was then placed in a pre-heated jacket and a source of nitrogen was connected to the supply stem. The jacket temperatures employed are stated in Tables 2A and 2B. The relief stem was opened (to permit escape and capture of liquid from the contents of the cell). The mixture in the cell was then compressed by applying nitrogen to the bottom of the piston to thereby force the piston against the mixture in the cell. The nitrogen was applied against the piston at a pressure of 1200 psig for two minutes. Thereafter, the nitrogen pressure was reduced to a value less than 1000 psig, and then increased to a value of 1000 psig. The contents of the cell were maintained at the designated temperature and under a pressure of 1000 psig for 24 hours.

4. At the end of the 24 hour period, the compressed slug, consisting of consolidated resin-coated particulate, before being cooled, was removed from the cell. It is believed that the resin coating at this time was completely cured.

5. Thereafter, the compressed slug was removed from the cell and permitted to cool to room temperature. The cooled slug was then cut to form test specimens (plugs). Each plug was 2 inches in diameter; the end surfaces of each plug were perpendicular to the linear axis, and each plug was 4 inches long.

6. The formed plugs were then allowed to dry at room temperature. The drying required about 24 to about 48 hours. The dry plugs were then ready for compressive strength measurement.

Determination of Unconfined Compressive Strength (UCS)

1. Each dry plug was placed in a press.

2. The press was activated to generate axial compressive force on the plug at the rate of 100 psig per minute.

3. The force was applied until the plug failed in compression.

TABLE 2A

UNCONFINED COMPRESSIVE STRENGTH (UCS)

| | Sample No. | | | | | |
|---|---|---|---|---|---|---|
| Test Condition | 1 | | 2 | | 5 | |
| Temperature °F. | 200 | 120 | 200 | 120 | 200 | 120 |
| Activator material | none | DEGMBE | none | DEGMBE | none | DEGMBE |
| Activator quantity lbs/100 lbs of sample | | 0.70 | | 0.70 | | 0.70 |
| Applied load at failure lbs(force) test 1 | 96.60 | 106.40 | 349.00 | 175.00 | 985.00 | 333.90 |
| Applied load at failure lbs(force) test 2 | 172.10 | 107.10 | 201.20 | 220.40 | 995.80 | 309.60 |
| Applied load at failure lbs(force) average of tests 1 and 2 | 134.35 | 106.75 | 275.10 | 197.70 | 990.40 | 321.75 |
| Average Applied load at failure lbs(force)/in² | 42.79 | 34.00 | 87.61 | 62.96 | 315.41 | 102.47 |

Regarding the average results obtained for samples 1, 2 and 5, it is seen that the required applied load to produce failure increased as the quantity of coating increased. Noting samples 1 and 5 it is seen that increasing the quantity of coating by a factor of about 2 resulted in an increase of required applied load by a factor of about 7.4 for samples cured at 200° F. (no activator), and by a factor of about 3 for samples cured at 120° F. in the presence of an activator.

TABLE 2B

UNCONFINED COMPRESSIVE STRENGTH (UCS)

| | Sample No. | | | |
|---|---|---|---|---|
| Test Condition | 3 | | 4 | |
| Temperature °F. | 200 | 120 | 200 | 120 |
| Activator material | none | DEGMBE | none | DEGMBE |
| Activator quantity lbs/100 lbs sample | | 0.70 | | 0.70 |
| Applied load at failure lbs (force) | 0.00 | 31.00 | 135.30 | 81.90 |

TABLE 2B-continued

UNCONFINED COMPRESSIVE STRENGTH (UCS)

| | Sample No. | | | |
|---|---|---|---|---|
| Test Condition | 3 | | 4 | |
| test 1 | | | | |
| Applied load at failure lbs (force) | 19.70 | 18.00 | 125.10 | 72.10 |
| test 2 | | | | |
| Applied load at failure lbs (force) | 9.85 | 24.50 | 130.20 | 77.00 |
| average of tests 1 and 2 | | | | |
| Average Applied load at failure lbs (force)/in² | 3.14 | 7.80 | 41.47 | 24.52 |

Regarding the average results obtained for samples 3 and 4, which did not include a novolac in the coating, it is seen that the required applied load to produce failure increased as the quantity of coating increased. Noting samples 3 and 4 it is seen that increasing the quantity of coating by about a factor of about 1.4 resulted in an increase of required applied load by a factor of about 13.2 for samples cured at 200° F. (no activator), and by a factor of about 3.1 for samples cured at 120° F. in the presence of an activator.

Comparing the results obtained for samples 2 and 3, it is seen that the inclusion of a novalac in the coating resulted in an increase of required applied load by a factor of about 27.9 for samples cured at 200° F. (no activator), and by a factor of about 8.1 for samples cured at 120° F. in the presence of an activator.

Comparing the results obtained for samples 4 and 5, it is seen that the inclusion of a novalac in the coating resulted in an increase of required applied load by a factor of about 7.6 for samples cured at 200° F. (no activator), and by a factor of about 4.2 for samples cured at 120° F. in the presence of an activator.

EXAMPLE 3

Specimens taken from the resin-coated particulate materials, identified as samples 1, 2 and 5 of Example 1, were tested to determine the amount of ignitable material lost as a result of the heating. The results obtained for samples 1, 2 and 5 are reported in Table 3, below.

The Procedure Employed is Described Below.
1. A ceramic crucible and lid were placed in an oven which had been preheated to a temperature of 1700° F. The crucible and lid remained in the oven at 1700° F. for 15 minutes. Thereafter, the crucible and lid were placed in a desiccator containing a standard desiccant and remained therein until cooled to room temperature.
2. The crucible and lid were then weighed.
3. A test specimen weighing about 8 grams taken from a sample (1, 2 and 5) prepared in Example 1 was placed in the crucible and covered with the lid. The crucible, lid and test specimen were then weighed.
4. The lid-covered crucible containing the test specimen was then placed in an oven. The temperature in the oven was then allowed to increase to a temperature of 1700° F.
5. The lid-covered crucible containing the test specimen was maintained in the oven at a temperature of 1700° F. for 2 hours.
6. The lid-covered crucible containing the test specimen was placed in a desiccator containing a standard desiccant and remained therein until cooled to room temperature. Inspection revealed no black or dark-colored residue in the crucible.
7. The crucible, lid and test specimen were then weighed.
8. The difference between the weight of the crucible, lid and sample before heating (step 3) and the weight of the crucible, lid and sample after heating (step 7) was determined. The difference was the loss of weight of the test specimen caused by heating.
9. The difference between the weight of the crucible, lid and sample before heating (step 3) and the weight of the crucible and lid (step 2) was determined. The difference was the weight of the test specimen before heating.
10. The loss of weight the test specimen after heating (step 8) was divided by the weight of the test specimen before heating (step 9). The calculation, in terms of pounds of weight loss per 100 pounds of sample, is reported in Table 3, below.

TABLE 3

LOSS ON IGNITION (LOI)
POUNDS MATERIAL LOSS PER 100 POUNDS OF SAMPLE

| Sample No. | | |
|---|---|---|
| 1 | 2 | 5 |
| 2.05 | 2.971 | 4.298 |

EXAMPLE 4

Specimens taken from the resin-coated particulate materials, identified as samples 1, 2, 3, 4 and 5 of Example 1, after having been cured, were pressed to determine the crush resistance of each sample. The obtained results, which are reported in Table 4, below, are presented in terms of the fines produced by the applied crushing force.

The Procedure Employed is Described Below.

Crush resistance tests were performed on test specimens prepared from each of samples 1, 2, 3, 4 and 5 as made in Example 1.
1. About 100 grams of coated particulate was taken from a specified sample. The particulate was heated at a temperature of about 250° for two hours and thereafter allowed to cool to room temperature. Then an amount weighing about 60 grams was taken from the heat treated particulate.
2. The 60 gram amount was placed on the top screen of a stacked array consisting of two screens and a pan. A 20 mesh screen was on the top, a 40 mesh screen was under the 20 mesh screen and the pan was placed under the 40 mesh screen. The array was shaken for 10 minutes by use of a testing sieve shaker.
3. Forty (40) grams of particulate remaining on the 40 mesh screen was saved. This was the test specimen. The particulate remaining on the 20 mesh screen and the particulate in the pan were each discarded.
4. The weighed particulate (40 grams) from the 40 mesh screen was placed in a cell having a 2-inch inside diameter. The surface of the sand was leveled in the cell.
5. A piston was inserted into the cell and positioned against the surface of the particulate in the cell. The piston was sized to slidably fit in the interior of the cell.
6. The cell and piston were placed in a press. The load necessary to produce the pressures indicated in Table 4 was applied. The prescribed load was achieved within 1 minute. The prescribed load was held for two minutes and then released to a value of zero. (A load of 12566 pounds produced a pressure of 4000 psig. A load of 31415 pounds produced a pressure of 10,000 psig.)

7. The crushed material in the cell was placed on the 40 mesh screen which was positioned over the pan. The screen and pan were shaken for 10 minutes.

8. The crushed material remaining on the 40 mesh screen was discarded. The material in the pan was saved and weighed. The pan material is referred to herein as "fines."

9. Steps 1-8 were performed 3 times on each sample for each designated pressure. (Accordingly 30 tests were performed)

10. The fines are reported in Table 4 as a weight percent of the material originally placed in the cell. (See step 4, above. The report is the average of the three tests performed on each sample).

TABLE 4

CRUSH RESISTANCE TESTING
Percent of Fines passing 40 mesh US Sieve Series
(particles smaller than 0.417 mm)

| Load Pressure lbs(force)/in$^2$ | 20/40 Ottawa Sand No coating | Sample 1 | Sample 2 | Sample 3 | Sample 4 | Sample 5 |
|---|---|---|---|---|---|---|
| 4000 | 6.46 | 2.94 | 1.33 | 4.43 | 4.87 | 1.59 |
| 10,000 | 48.26 | 21.74 | 12.5 | | | 6.84 |

The results show that crush resistance increases as the quantity of coating increases.

The results, based upon the produced fines, show that the crush resistance of the coated particulate material, at 4000 psig (samples 1-5), exceeded the crush resistance of the un-coated material by a factor in the range of from about 1.33 to about 4.86.

The results, based upon the produced fines, show that the crush resistance of the coated particulate material, at 10000 psig (samples 1, 2 and 5), exceeded the crush resistance of the un-coated material by a factor in the range of from about 2.23 to about 7.06.

Having described the invention that which is claimed is:

1. A method for coating a solid substrate with a curable resin, said method consisting essentially of the steps of:
    (a) placing a quantity of said substrate consisting of particulate solids into a container;
    (b) placing a quantity of a first resin selected from liquid epoxy resins into said container, wherein said quantity of said first resin is an amount in the range of from about 0.4 to about 2.0 pounds of said first resin per 100 pounds of said particulate solids;
    (c) mixing said particulate solids with said first resin in said container to form a first interim product which is damp and which has no visible clumps or agglomerates;
    (d) placing a quantity of a liquid hardener for said first resin in said container with said damp first interim product while continuing said mixing, wherein said quantity of said hardener is an amount in the range of from about 0.15 to about 0.35 pounds of said hardener per pound of said first resin to thereby form a second interim product which is damp;
    (e) placing a quantity of a second resin in said container with said damp second interim product while continuing said mixing, wherein said second resin is a novolac resin, and, further, wherein said quantity of said second resin is an amount in the range of from about 1.04 to about 4.3 pounds of said second resin per 100 pounds of said particulate solids;
    (f) placing a quantity of a curing agent for said novolac resin in said container with said damp second interim product and said novolac, wherein the quantity of said curing agent for said novolac resin is an amount in the range of from about 0.05 to about 0.22 pounds of said curing agent per 100 pounds of said particulate solids;
    (g) continuing said mixing to thereby produce a dry flowable product which is comprised of said particulate solids having an undercoating in contact with said particulate solids, and an over coating in contact with said undercoating, said undercoating consisting essentially of said first resin and a hardener therefor and, said over coating consisting essentially of said second resin and a curing agent therefor; wherein said first resin is curing and said second resin is curable and;
    (h) terminating said mixing;
wherein the temperature of said particulate solids, said first resin, said liquid hardener for said first resin, said second resin and said curing agent for said second resin is equal to or less than ambient temperature.

2. The method of claim 1 wherein said second resin and said curing agent for said second resin are combined and simultaneously placed in said container, and further wherein the quantity of said combination of said second resin and said curing agent for said second resin is an amount in the range of from about 1.2 to about 4.5 pounds of said combination per 100 pounds of said particulate solids.

3. The method of claim 2 wherein said curable second coating is cured by heating said dry flowable product.

4. The method of claim 3 wherein said heating is conducted at a temperature of at least about 200° F. for a time sufficient to cure said second coating.

5. The method of claim 4 wherein said heating is conducted in a water containing environment.

6. The method of claim 3 wherein said heating is conducted at a temperature of at least about 120° F. in the presence of a chemical activator for a time sufficient to cure said second coating.

7. The method of claim 6 wherein said heating is conducted in a water containing environment.

8. The method of claim 5 wherein said water containing environment is a sub-surface hydrocarbon containing formation.

9. The method of claim 7 wherein said water containing environment is a sub-surface hydrocarbon containing formation.

* * * * *